(12) United States Patent
Witbrock et al.

(10) Patent No.: US 11,366,990 B2
(45) Date of Patent: Jun. 21, 2022

(54) TIME-SERIES REPRESENTATION LEARNING VIA RANDOM TIME WARPING

(71) Applicant: International Business Machines Corporation, Armonk, NY (US)

(72) Inventors: Michael J. Witbrock, Ossining, NY (US); Lingfei Wu, Croton on Hudson, NY (US); Cao Xiao, White Plains, NY (US); Jinfeng Yi, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 897 days.

(21) Appl. No.: 15/595,221

(22) Filed: May 15, 2017

(65) Prior Publication Data
US 2018/0330201 A1    Nov. 15, 2018

(51) Int. Cl.
| G06K 9/62 | (2022.01) |
| G06N 20/00 | (2019.01) |
| G06F 15/76 | (2006.01) |
| G06N 20/10 | (2019.01) |
| G06N 7/00 | (2006.01) |

(Continued)

(52) U.S. Cl.
CPC ........... G06K 9/6278 (2013.01); G06F 15/76 (2013.01); G06K 9/6256 (2013.01); G06K 9/6269 (2013.01); G06N 20/00 (2019.01); G06N 20/10 (2019.01); G06N 3/0454 (2013.01);
(Continued)

(58) Field of Classification Search
CPC .. G06K 9/6278; G06K 9/6256; G06K 9/6269; G06N 20/00; G06N 20/10; G06N 3/0454; G06N 3/0472; G06N 3/088; G06N 5/003; G06N 7/005; G06F 15/76
See application file for complete search history.

(56) References Cited

U.S. PATENT DOCUMENTS

| 2014/0195474 A1* | 7/2014 | Anguera | ................ G06N 5/047 706/48 |
| 2014/0372807 A1* | 12/2014 | Poola | .................. G06F 11/3414 714/39 |

(Continued)

OTHER PUBLICATIONS

Chu, Selina, et al. "Iterative deepening dynamic time warping for time series." Proceedings of the 2002 SIAM International Conference on Data Mining. Society for Industrial and Applied Mathematics, 2002. (Year: 2002).*

(Continued)

*Primary Examiner* — Li B. Zhen
*Assistant Examiner* — Henry Nguyen
(74) *Attorney, Agent, or Firm* — Cantor Colburn LLP; Stosch Sabo

(57) ABSTRACT

Embodiments of the present invention provide a computer-implemented method for performing unsupervised time-series feature learning. The method generates a set of reference time-series of random lengths, in which each length is uniformly sampled from a predetermined minimum length to a predetermined maximum length, and in which values of each reference time-series in the set are drawn from a distribution. The method generates a feature matrix for raw time-series data based on a set of computed distances between the generated set of reference time-series and the raw time-series data. The method provides the feature matrix as an input to one or more machine learning models.

20 Claims, 6 Drawing Sheets

(51) Int. Cl.
  *G06N 5/00* (2006.01)
  *G06N 3/08* (2006.01)
  *G06N 3/04* (2006.01)

(52) U.S. Cl.
  CPC ........... *G06N 3/0472* (2013.01); *G06N 3/088* (2013.01); *G06N 5/003* (2013.01); *G06N 7/005* (2013.01)

(56) References Cited

U.S. PATENT DOCUMENTS

| | | | | |
|---|---|---|---|---|
| 2015/0331835 | A1* | 11/2015 | Avron | G06F 17/18 702/179 |
| 2015/0346834 | A1* | 12/2015 | Martinez Fernandez | G06F 3/017 340/12.5 |
| 2016/0217384 | A1* | 7/2016 | Leonard | G06F 17/18 |
| 2018/0150547 | A1* | 5/2018 | Pallath | G06N 20/00 |

OTHER PUBLICATIONS

Rakthanmanon, Thanawin, et al. "Searching and mining trillions of time series subsequences under dynamic time warping." Proceedings of the 18th ACM SIGKDD international conference on Knowledge discovery and data mining. 2012. (Year: 2012).*

Baydogan, Mustafa Gokce, George Runger, and Eugene Tuv. "A bag-of-features framework to classify time series." IEEE transactions on pattern analysis and machine intelligence 35.11 (2013): 2796-2802. (Year: 2013).*

Liao, T. Warren. "Clustering of time series data—a survey." Pattern recognition 38.11 (2005): 1857-1874. (Year: 2005).*

Lei, Hansheng, and Bingyu Sun. "A study on the dynamic time warping in kernel machines." 2007 Third International IEEE Conference on Signal-Image Technologies and Internet-Based System. IEEE, 2007. (Year: 2007).*

Liu, Jun, Shuiwang Ji, and Jieping Ye. "Multi-task feature learning via efficient l2, 1-norm minimization." arXiv preprint arXiv: 1205.2631 (2012). (Year: 2012).*

Argyriou, Andreas, Theodoros Evgeniou, and Massimiliano Pontil. "Convex multi-task feature learning." Machine learning 73.3 (2008): 243-272. (Year: 2008).*

Ko, Ming Hsiao, et al. "Using dynamic time warping for online temporal fusion in multisensor systems." Information Fusion 9.3 (2008): 370-388. (Year: 2008).*

Baydogan, Mustafa Gokce, et al., "Time Series Representation and Similarity Based on Local Autopatterns," Data Mining and Knowledge Discovery 30, No. 2, 2016, pp. 476-509.

Cuturi, Marco, et al., "A Kernel for Time Series Based on Global Alignments", International Conference on Acoustics, Speech, and Signal Processing, IEEE 2007, pp. 413-416.

Giusti, Rafael et al., "Improved Time Series Classification with Representation Diversity and SVM," 2016 15th IEEE International Conference on Machine Learning and Applications (ICMLA), pp. 1-6, IEEE, 2016.

Kate, Rohit J., "Using Dynamic Time Warping Distances as Features for Improved Time Series Classification", Data Mining and Knowledge Discovery 30, No. 2, Mar. 2016, pp. 283-312.

Lei, et al., "Method and System for Time Series Representation Learning via Dynamic Time Warping", U.S. Appl. No. 15/415,202, filed Jan. 25, 2017.

Liao, T. Warren, "Clustering of Time Series Data—a Survey", Louisiana State University, Pattern Recognition 38 (2005); 18 pages.

Perng, Chang-Shing, et al., "Landmarks: A New Model for Similarity-Based Pattern Querying in Time Series Databases", Data Engineering, 2000, IEEE Xplore Aug. 2002, 10 pages.

Troncoso, Alicia, et al., "A Multi-Scale Smoothing Kernel for Measuring Time-Series Similarity," Neurocomputing 167, 2015, pp. 8-17.

Xing, Zhengzheng, et al., "A Brief Survey on Sequence Classification", SIGKDD Explorations, vol. 12-Issue 1, 2010, 9 pages.

* cited by examiner

TIME-SERIES REPRESENTATION LEARNING VIA RANDOM TIME WARPING

BACKGROUND

The present invention generally relates to machine learning systems, and more specifically, to performing a machine learning process via random time warping of time-series data.

The phrase "machine learning" broadly describes a function of an electronic system that learn from data. A machine learning system, engine, or module can include a trainable machine learning algorithm that can be trained, such as in an external cloud environment, to learn functional relationships between inputs and outputs that are currently unknown.

The phrase "time-series data" can refer to a sequence of data that is repeatedly generated and/or captured by a device (e.g., a computing device) at a plurality of time values during a certain time interval. Examples of time-series data include the continuous monitoring of a person's heart rate, hourly readings of air temperature, monthly rainfall data, and the like. Time-series data can be analyzed to understand the underlying structures and functions that produce the observations. Understanding the mechanisms of time-series data allows a mathematical model to be developed that explains the data in such a way that prediction, monitoring, or control can occur.

SUMMARY

Embodiments of the present invention provide a computer-implemented method for performing unsupervised time-series feature learning. The method generates a set of reference time-series of random lengths, in which each length is uniformly sampled from a predetermined minimum length to a predetermined maximum length, and in which values of each reference time-series in the set are drawn from a distribution. The method generates a feature matrix for raw time-series data based on a set of computed distances between the generated set of reference time-series and the raw time-series data. The method provides the feature matrix as an input to one or more machine learning models.

Embodiments of the present invention provide a system for performing unsupervised time-series feature learning. The system includes one or more processors configured to perform a method. The method generates a set of reference time-series of random lengths, in which each length is uniformly sampled from a predetermined minimum length to a predetermined maximum length, and in which values of each reference time-series in the set are drawn from a distribution. The method generates a feature matrix for raw time-series data based on a set of computed distances between the generated set of reference time-series and the raw time-series data. The method provides the feature matrix as an input to one or more machine learning models.

Embodiments of the invention provide a computer program product for performing unsupervised time-series feature learning, the computer program product comprising a computer readable storage medium having program instructions embodied therewith. The program instructions are executable by system operatively coupled to one or more processors to cause the system to perform a method. The method generates a set of reference time-series of random lengths, in which each length is uniformly sampled from a predetermined minimum length to a predetermined maximum length, and in which values of each reference time-series in the set are drawn from a distribution. The method generates a feature matrix for raw time-series data based on a set of computed distances between the generated set of reference time-series and the raw time-series data. The method provides the feature matrix as an input to one or more machine learning models.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
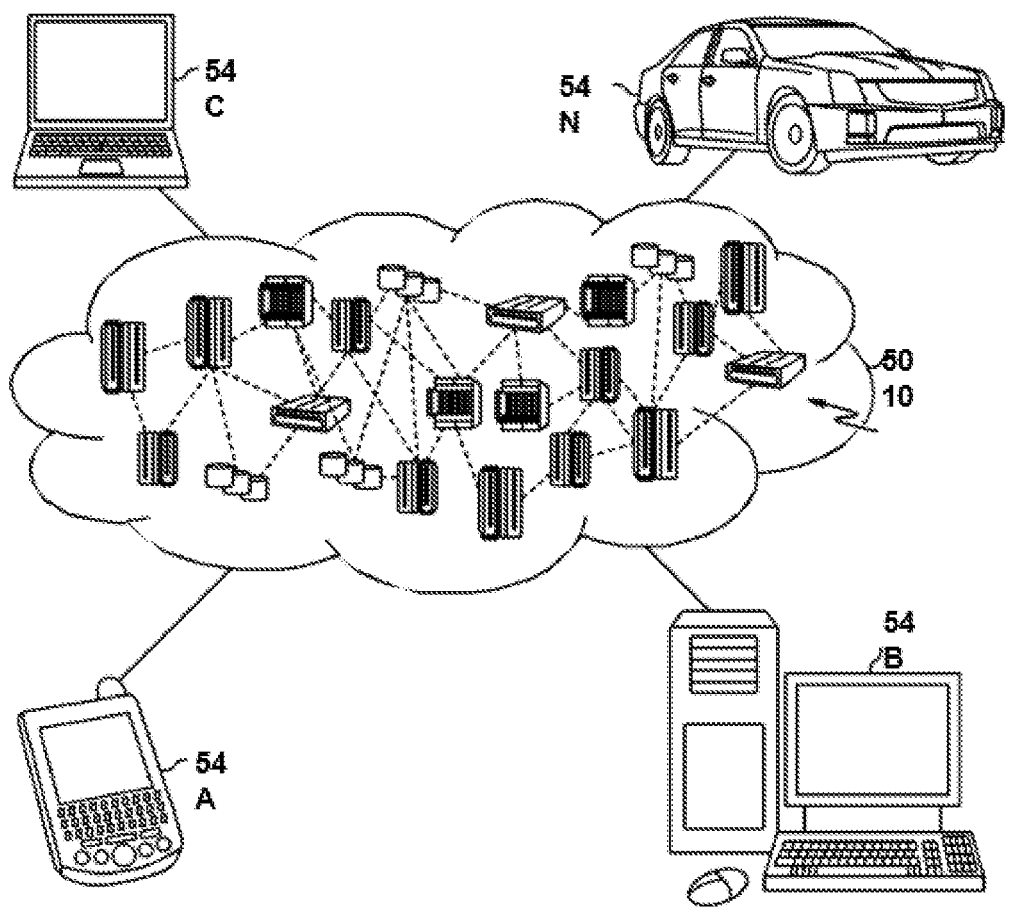
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, a process, a method, an article, or an apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
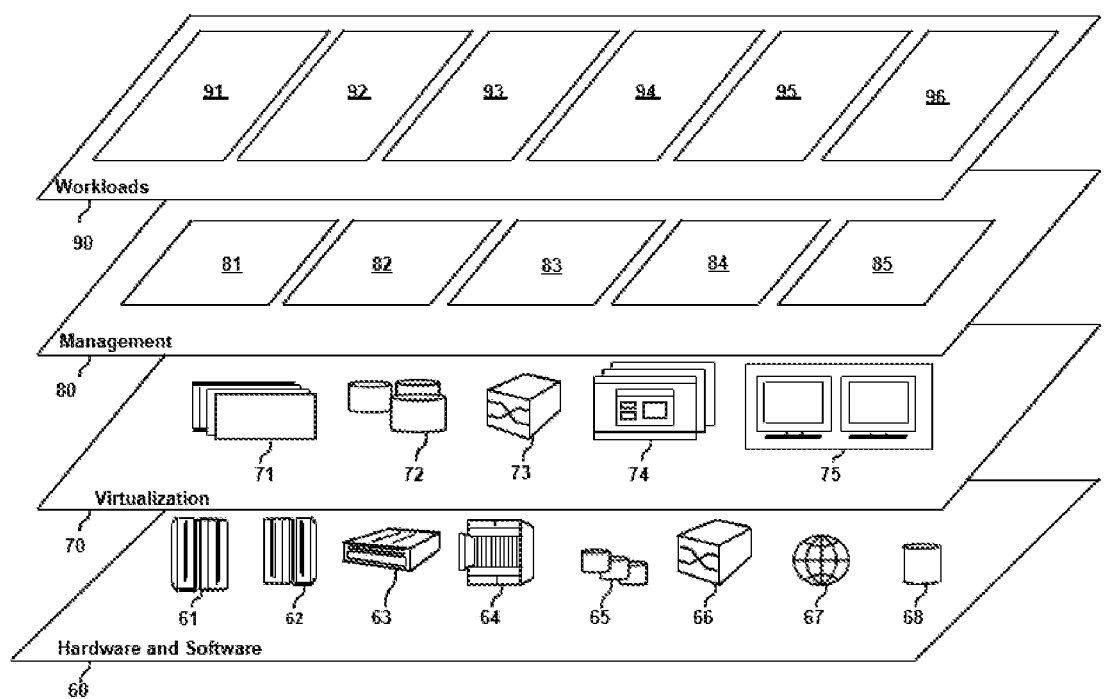
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and time-series data processing 96.

Turning now to an overview of technologies that are more specifically relevant to aspects of the invention, as previously noted herein, the phrase "machine learning" broadly describes a function of electronic systems that learn from data. A machine learning system, engine, or module can include a trainable machine learning algorithm that can be trained, such as in an external cloud environment, to learn functional relationships between inputs and outputs that are currently unknown.

Machine learning functionality can be implemented using an artificial neural network (ANN) having the capability to be trained to perform a currently unknown function. In machine learning and cognitive science, ANNs are a family of statistical learning models inspired by the biological neural networks of animals, and in particular the brain. ANNs can be used to estimate or approximate systems and functions that depend on a large number of inputs.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was read.

The large volume of the data that are generated by and processed through computer application domains can be organized into naturally occurring sequences. If such data sequences exhibit temporal dependency implicitly (an ordering on values) or explicitly (with time stamps), they are often referred as the set of time-series data. Mathematically, the set of time-series data can be expressed as $\{x_i\}_{i=1}^{N}$, where N is the number of time-series in the set and $L=|x_i|$ is the maximum length of each time-series in the set. Feature representation of time-series data can be learned to facilitate employment of the time series data by a machine learning algorithm.

Machine learning is often employed by numerous technologies to determine inferences and/or relationships among digital data. For example, machine learning technologies, signal processing technologies, image processing technologies, data analysis technologies and/or other technologies employ machine learning models to analyze digital data, process digital data, determine inferences from digital data, and/or determine relationships among digital data. Oftentimes digital data is formatted as time-series data. Time-series data can be a sequence of data that is repeatedly generated and/or captured by a device (e.g., a computing device) at a plurality of time values during a certain time interval. However, time-series data generally cannot be directly processed and/or directly analyzed by known machine learning models as there are no explicit features in time-series data. Rather, a feature representation of time series data is learned to facilitate analysis of the time series data by a machine learning model.

Time-series analysis can be especially challenging as a time-series could have different lengths, and a signal could be generated with time shifts and different scales but with a similar pattern. Known time-series analysis methods have taken account of these factors in an alignment (also called a warping function), which provides a distance/similarity measure between two time-series $x_i=(x_i^1, \ldots, x_i^n)$ and $x_j=(x_j^1, \ldots, x_j^m)$ of length n and m respectively. A number of time-series kernel-based methods have been proposed to combine a similarity measure provided by dynamic time warping (DTW) with mature tools developed in the vector domain such as Support Vector Machine (SVM).

Despite the successes of various explicit feature selection methods, kernel methods are still being developed for learning non-linear models by implicitly transforming simple data representations into a high-dimension feature space. The main obstacles for applying standard vector kernels to time-series are largely due to two distinct characteristics of time-series, namely variable length and dynamic time scaling and shifts. Because DTW-like elastic distance measures take into account these two issues, several research attempts have been made to combine DTW directly with a support vector machine (SVM). Unfortunately, the DTW distance is not rigorously a distance metric rather than an optimum, and as a result cannot be directly used to derive a valid positive definite (p.d.) kernel. To overcome these difficulties, some have proposed a family of global alignment kernels mainly inspired by DTW that consider all possible alignments in DTW and have been proven to be a p.d. kernel. However, the effectiveness of the prior global alignment kernels are often impaired by the diagonal dominance of the resulting kernel matrix. Moreover, those global alignment kernels are difficult to scale as they require a quadratic complexity in both the number and length of time-series in computation and a large corresponding memory.

Turning now to an overview of the aspects of the invention, one or more embodiments of the invention address the above-described shortcomings of the prior art by providing a novel approach for approximating a positive definite time-series kernel for large-scale time-series problems via random warping series by transforming raw time-series to a randomized low-dimensional feature space using a number R of random series of random length D. The resulting feature matrix is then provided as input to one or more machine learning models to generate a machine learning output. This is performed in part by generating, by a system operatively coupled to one or more processors, a set of reference time-series of random lengths, wherein each length is uniformly sampled from a predetermined minimum length to a predetermined maximum length, and wherein values of each reference time-series in the set are drawn from a distribution.

Aspects of the invention address the shortcomings of the prior art by generating an explicit feature map given by a distribution of random warping series (RWS), which exploits dynamic time warping (DTW) or other similarity/distance functions to find alignments between time-series data and the random series. In some embodiments of the invention, raw time-series data is transformed into a low-dimensional Euclidean inner product space using a number R of random series of random lengths D. This process substantially reduces the computational complexity of existing DTW-based techniques from $O(N^2L^2)$ to $O(NRLD)$ and memory consumption from $O(NL+N^2)$ to $O(NR)$.

As will be described in more detail below, a feature representation of a time series data is learned to facilitate analysis of the time series data by a machine learning model. Time-series feature representations can be used for a variety of machine learning processes. For example, time-series feature representation can be used in patient disease classification using ECG in health-informatics and real-time data analytics for mobile health applications such as data generated via a sensor from a wearable medical device. Time-series feature representations can also be used, for example, for anomaly detection of a sequence of a user's system or for classifying a transaction sequence data in a bank.

Figure 3:
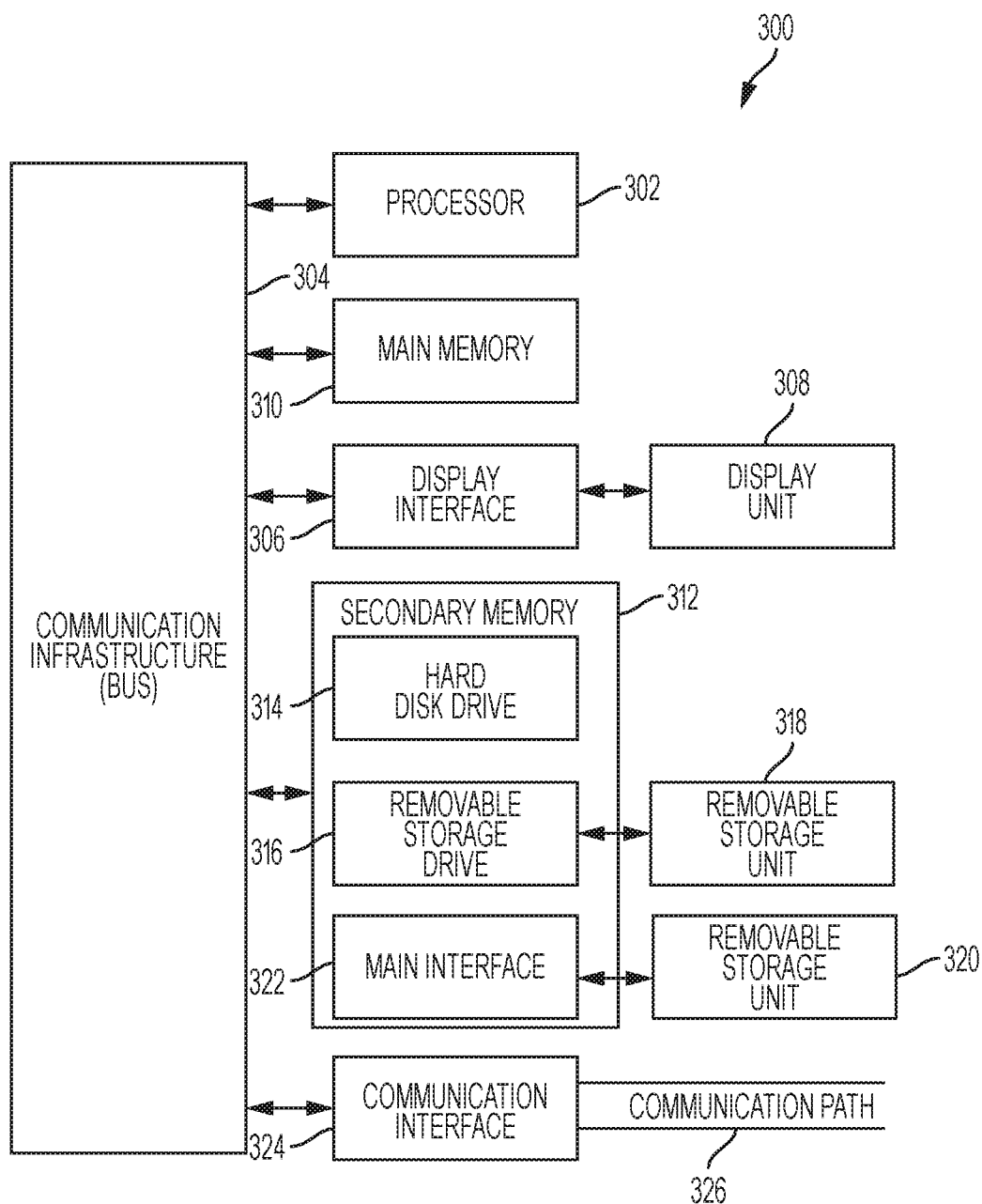
FIG. 3 depicts an exemplary computer system capable of implementing one or more embodiments of the present invention.

Turning now to a more detailed description of the present disclosure, FIG. 3 illustrates a high level block diagram showing an example of a computer-based system 300 useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional system are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etcetera. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

Figure 4:
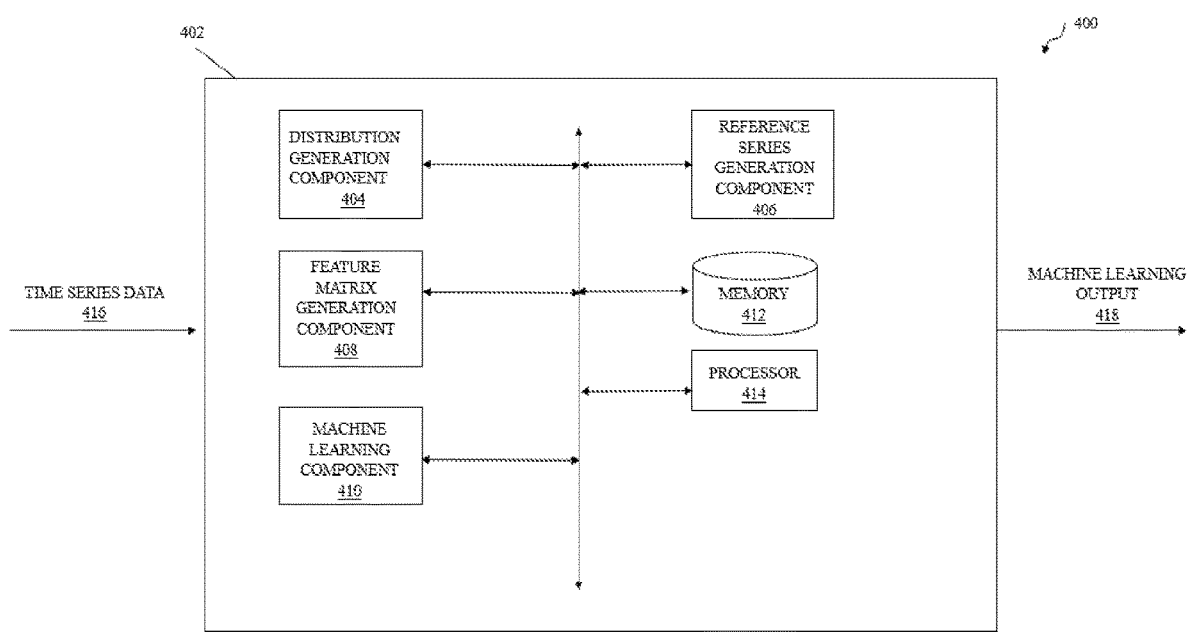
FIG. 4 depicts an exemplary system that facilitates machine learning using time-series data in accordance with one or more embodiments of the present invention.

FIG. 4 illustrates a block diagram of an example, non-limiting system 400 that facilitates machine learning using time-series data in accordance with one or more embodiments of the present invention. System 400 is configured to learn a feature representation for raw time-series data by approximating a positive definite kernel via random warping, in particular, by transforming raw time-series to a randomized low-dimensional feature space using a number R of random series of random length D, in which the resulting feature representation can be combined with various machine learning methods to perform a wide variety of tasks.

System 400 is a machine learning system that can be utilized to solve a variety of technical issues (e.g., learning previously unknown functional relationships) in connection with technologies such as, but not limited to, machine learning technologies, time-series data technologies, data analysis technologies, data classification technologies, data clustering technologies, trajectory/journey analysis technologies, medical device technologies, collaborative filtering technologies, recommendation system technologies, signal processing technologies, word embedding technologies, topic model technologies, image processing technologies, video processing technologies, audio processing technologies, and/or other digital technologies. System 400 employs hardware and/or software to solve problems that are highly technical in nature, that are not abstract and that cannot be performed as a set of mental acts by a human.

Examples of the problems addressed by system 400, which embodies aspects of the invention, include the high computational complexity that is required to evaluate a positive definite kernel using known DTW-based techniques (e.g., $O(N^2L^2)$) and the high memory consumption required to store the original time-series and a resulting kernel matrix (e.g., $O(NL+N^2)$). Examples of technical improvements provided by aspects of the invention to address the above-described problems include a reduction in the computational complexity of existing DTW-based techniques from $O(N^2L^2)$ to $O(NRLD)$ and memory consumption from $O(NL+N^2)$ to $O(NR)$. This reduction in both computation and memory storage allows for more efficient training and testing when combining with empirical risk minimization (ERM) classifiers such as SVM.

In certain embodiments of the invention, some or all of the processes performed by system 400 are performed by one or more specialized computers (e.g., one or more specialized processing units, a specialized computer with a time-series data component, etc.) for carrying out defined tasks related to machine learning. In some embodiments of the invention, system 400 and/or components of the system are employed to solve new problems that arise through advancements in technologies mentioned above, employment of time-series data, machine learning process, and/or computer architecture, and the like. In one or more embodiments of the invention, the system 400 provides the above-described technical improvements to time-series data systems, machine learning systems, artificial intelligence systems, data analysis systems, data analytics systems, data classification systems, data clustering systems, trajectory/journey analysis systems, medical device systems, collaborative filtering systems, recommendation systems, signal processing systems, word embedding systems, topic model systems, image processing systems, video processing systems, and/or other digital systems. In one or more embodiments of the invention, the system 400 also provide technical improvements to a central processing unit associated with a machine learning process by improving processing performance of the central processing unit, reducing computing bottlenecks of the central processing unit, improving processing efficiency of the central processing unit, and/or reducing an amount of time for the central processing unit to perform the machine learning process.

In FIG. 4, system 400 includes a time-series data component 402 that includes a distribution generation component 404, a reference time-series generation component 406, a feature matrix generation component 408, and a machine learning component 410. In some embodiments of the invention, time-series data component 402 constitutes machine-executable component(s) embodied within machine(s), (e.g., embodied in one or more computer readable mediums (or media) associated with one or more machines). Such component(s), when executed by the one or more machines, (e.g., computer(s), computing device(s), virtual machine(s), etc.) cause the machine(s) to perform the operations described. In some embodiments of the invention, time-series data component 402 includes memory 412 that stores computer executable components and instructions. Furthermore, time-series data component 402 in some embodiments of the invention includes a processor 414 to facilitate execution of the instructions (e.g., computer executable components and corresponding instructions) by time-series data component 402. As shown, distribution generation component 404, reference time-series generation component 406, feature matrix generation component 408, machine learning component 410, memory 412, and/or processor 414 are electrically and/or communicatively coupled to one another in one or more embodiments of the invention.

In general, time-series data component 402 is configured to receive time-series data 416 and output a machine learning output 418. Time-series data 416 includes streams or sequences of time-series data. In some embodiments of the invention, time-series data 416 includes two or more streams of time-series data with unequal time spans. In some embodiments of the invention, a first stream of time-series data includes a first time span and a second stream of time-series data includes a second time span that is different than the first time span. In some embodiments of the invention, time-series data 416 include two or more streams of time-series data with equal time spans. As used herein, "time-series data" can be one or more sequences of data that is repeatedly generated and/or captured at a plurality of time values during a certain time interval. In some embodiments of the invention, time-series data 416 is raw time-series data (e.g., unprocessed time-series data).

The distribution generation component 404 is configured to generate one or more probability distributions for use by system 400. In some embodiments of the invention, distribution generation component 404 generates metadata pertaining to the time-series data 416. For example, in some embodiments of the invention distribution generation component 404 generates a probability distribution of the time-series data 416. In some embodiments of the invention, rather than generating a probability distribution from the time-series data 416, the distribution generation component generates or selects a random distribution such as a Gaussian distribution. In some embodiments of the invention, the distribution is predetermined. The distribution generation component 404 is configured to transmit the resulting distribution to the reference time-series generation component 406 for further processing.

Together, reference time-series generation component 406 and feature matrix generation component 406 perform a random warping series approximation process. In particular, reference time-series generation component 406 is configured to generate a set of reference time-series, in which each length is uniformly sampled from a predetermined minimum length to a predetermined maximum length to capture the optimal alignment of time-series data 416. The corresponding values of each reference time-series in the set are drawn from the distribution provided by distribution generation component 404. In some embodiments of the invention, the minimum length and the maximum length are parameters that are selected, provided, predetermined, or automatically learned by system 400. In some embodiments of the invention, the minimum length is 1 and the maximum length is 100. After generation of the set of reference time-series, generation component 406 transmits the set of reference time-series to the feature matrix generation component 408.

The feature matrix generation component 406 is configured to generate a feature matrix for the time-series data 416 based on a set of computed distances between the generated set of reference time-series and the time-series data 416. In some embodiments of the invention, a feature vector is computed between each of the generated reference time-series and the input time-series data 416. The feature vectors are then concatenated to form a feature matrix. In some embodiments of the invention, the feature vectors are generated via an implementation of dynamic time warping with or without a window size. In some embodiments of the invention, the feature matrix is generated by computing a set of distance vectors between the raw time-series data and the set of generated reference time-series, translating the distance vectors into similarity vectors, and concatenating the similarity vectors to generate the feature matrix. In some embodiments of the invention, the feature vectors and/or feature matrix are generated via other suitable similarity or distance functions as known to those having skill in the art.

Some of the functions performed by the reference time-series generation component 406 and the feature matrix generation component 408 can be expressed mathematically via one or more algorithms. For example, in order to compute a kernel approximation using random series, a Monte Carlo (MC) based analysis method, like the one described below, is implemented in which random features are evaluated in a kernel space such as a Reproducing Kernel Hilbert Space (RKHS). In order to compute a positive definite kernel, in some embodiments of the invention, raw time-series data is transformed into a low-dimensional Euclidean inner product space using a random series on a randomized feature map $k(x_i,x_j)=<\phi(x_i),\phi(x_j)>$, where time-series $x_i$ includes a variable length of the maximum $|L|$. Thus the kernel evaluation can be approximated by the inner product between a pair of the transformed values: $k(x_i,x_j)=<\phi(x_i),\phi(x_j)>\approx<T(x_i),T(x_j)>$. The scalar $T(x_i)$ is computed using disimilarity measure $\tau(\omega_p^D,x_i)$, where $\omega_p^D$ is a random series of length D with each value drawn from a distribution p. The function $\tau$ could be any suitable esatlic similarity or distance measure such as for example, DTW. In order to lower the variance of $<T(x_i),T(x_j)>$, a MC method can be applied to compute $k(x_i,x_j)=<\phi(x_i),\phi(x_j)>\approx<T(x_i),T(x_j)>$. This computation can be performed by averaging over R random series $\omega_p^{D_i}$ of variable lengths, where each $D_i$ is uniformily sampled from [DMin, DMax]. The algorithm shown below is one example procedure for generating feature vectors for raw time-series data.

1: for r = 1, . . . , R do
2: Draw $D_r$ uniformly from [DMin, DMax]. Generate random time series $\omega_p^{D_r}$ of length $D_r$ with each value drawn from distribution p normalized by $\sigma$.
3: Compute a feature vector $T_r$ between generated $\omega_p^{D_r}$ and $\{x_i\}_{i=1}^N$ using DTW with or without a window size.
4: end for
5: Return feature matrix $T(\{x_i\}_{i=1}^N) = \frac{1}{\sqrt{R}}[T_1' \ T_2' \ ... \ T_R']$ Paramter $\sigma$ stems from a distribution p that could well capture the characteristics of time-series $\{x_i\}_{i=1}^N$, which could be provided to the system by a user or learned by a generative model. In some embodiments of the invention, if no prior information for an optimal alignment is provided to the system, the system uniformly samples the length of random series to give an unbiased estimate of D.

Compared to the prior global alignment kernels, computing the dense kernel matrix $K \in R^{N \times N}$ requires $O(N^2)$ times evaluation of DTW which usually takes $O(L^2)$ complexity based on Dynamic Programming (DP). Additionally, those prior methods need $O(NL+N^2)$ storage size complexity to store the original time-series and a resulting kernel matrix. The random warping series-based approximation disclosed herein enjoys the benefit of only needing a linear complexity of O(NRLD) computation and O(NR) storage size. This dramatic reduction in both computation and memory storage allows for more efficient training and testing when combining with empirical risk minimization (ERM) classifiers such as SVM.

Referring back to FIG. 4, machine learning component 410 processes a machine learning model based on the feature matrix generated for the time-series data 416. In some embodiments of the invention, the feature matrix generated by feature matrix generation component 408 is provided as an input for a machine learning model executed by the machine learning component 410. In certain embodiments of the invention, the machine learning component 410 employs parallel computing to process portions of the feature matrix with portions of the time-series data 416. For instance, in some embodiments of the invention, the machine learning component 410 performs parallel computing associated with two or more processors that process one or more portions of the time-series data in parallel. In one example, the machine learning component 410 executes a classification machine learning model using the generated feature matrix. In some embodiments of the invention, a classification machine learning model is a machine learning model that maps time-series data 416 to one or more categories. In another example, machine learning component 410 executes a regression machine learning model using the generated feature matrix. A regression machine learning model can be, for example, a machine learning model that determines relationships among the time-series data 416. In yet another example, the machine learning component 410 executes a clustering machine learning model using the generated feature matrix. In some embodiments of the invention, the clustering machine learning model is a machine learning model that groups related data from the time-series data 416 into a corresponding group, for example, nearest neighbors algorithms. The machine learning component 410 generates machine learning output 419. In some embodiments of the invention, the machine learning output 418 is generated by the machine learning model that is processed by the machine learning component 410 based on the generated feature matrix. In some embodiments of the invention, the machine learning output 418 provides one or more inferences, provides one or more predictions, and/or determines one or more relationships among the time-series data 416. As such, direct analysis and/or direct processing of the time-series data 416 is provided in certain embodiments of the invention. Moreover, performance of a processor (e.g., the processor 414) with respect to a machine learning process (e.g., a speed for performing machine learning and/or an amount of memory employed for machine learning) can be improved by allowing a machine learning model to employ matrices as inputs and/or to directly analyze time-series data. Furthermore, processing capability of a processor (e.g., the processor 414) associated with a machine learning process can be improved by allowing a machine learning model to employ matrices as inputs and/or to directly analyze time-series data. In some embodiments of the invention, indirect analysis is performed by the system 400, and as such the time-series data 416 is not directly analyzed by system 400.

The time-series data component 402 (e.g., distribution generation component 404, reference series generation component 406, feature matrix generation component 408, and/or the machine learning component 410) performs a distribution generation process, a reference series generation process, a feature matrix generation process, and/or a machine learning process associated with time-series data (e.g., time-series 416) that cannot be performed by a human (e.g., is greater than the capability of a single human mind). For example, an amount of time-series data processed, a speed of processing of times series data, and/or data types of the time-series data processed by the time-series data component 402 (e.g., distribution generation component 404, reference series generation component 406, feature matrix generation component 408, and/or the machine learning component 410) over a certain period of time can be greater, faster, and different than an amount, speed, and data type that can be processed by a single human mind over the same period of time. In some embodiments of the invention, the time-series data component 402 (e.g., distribution generation component 404, reference series generation component 406, feature matrix generation component 408, and/or the machine learning component 410) is fully operational towards performing one or more other functions (e.g., fully powered on, fully executed, etc.) while also performing the above-referenced distribution generation process, reference series generation process, feature matrix generation process, and/or machine learning process. Moreover, in some embodiments of the invention, machine learning output (e.g., machine learning output 418) generated by the time-series data component 402 (e.g., distribution generation component 404, reference series generation component 406, feature matrix generation component 408, and/or the machine learning component 410) includes information that is impossible to obtain manually by a user. For example, in some embodiments of the invention, an amount of information included in the machine learning output (e.g., machine learning output 418), and/or a variety of information included in the machine learning output (e.g., machine learning output 418) is more complex than information obtained manually by a user.

In some embodiments of the invention, machine learning component 410 employs one or more artificial intelligence techniques to execute the at least one machine learning model based on the generated feature matrix. For example, in some embodiments of the invention, machine learning component 410 extracts information that is indicative of correlations, inferences, and/or expressions from the generated feature matrix based on principles of artificial intelligence. In some embodiments of the invention, machine learning component 410 generates the machine learning output 418 based on the execution of the at least one machine learning model using the generated feature matrix. In some embodiments of the invention, the machine learning output 418 includes, for example, learning, correlations, inferences, and/or expressions associated with the generated feature matrix.

In some embodiments of the invention, machine learning component 410 performs learning with respect to the generated feature matrix explicitly or implicitly. In some embodiments of the invention, machine learning component 410 employs an automatic classification system and/or an automatic classification process to facilitate analysis of generated feature matrix. For example, in some embodiments of the invention, machine learning component 410 employs a probabilistic and/or statistical-based analysis (e.g., factoring into the analysis utilities and costs) to learn and/or generate inferences with respect to the generated feature matrix. Machine learning component 410 employs, for example, a support vector machine (SVM) classifier to learn and/or generate inferences for the generated feature matrix. Additionally or alternatively, in some embodiments of the invention, machine learning component 410 employs other classification techniques associated with Bayesian networks, decision trees, and/or probabilistic classification models. Classifiers employed by the machine learning component 410 can be explicitly trained (e.g., via a generic training data) as well as implicitly trained (e.g., via receiving extrinsic information). For example, with respect to SVM's, SVM's can be configured via a learning or training phase within a classifier constructor and feature selection module. A classifier can be, for example, a function that maps an input attribute vector, $x=(x_1, x_2, x_3, x_4, x_n)$, to a confidence that the input belongs to a class—that is, $f(x)$=confidence (class).

In some embodiments of the invention, machine learning component 410 includes an inference component (not shown) that further enhances automated aspects of the machine learning component 410 utilizing in part inference based schemes to facilitate learning, and/or generating inferences for the generated feature matrix. In some embodiments of the invention, machine learning component 410 employs any suitable machine-learning based techniques, statistical-based techniques, and/or probabilistic-based techniques. For example, in some embodiments of the invention, machine learning component 410 employs expert systems, fuzzy logic, SVMs, Hidden Markov Models (HMMs), greedy search algorithms, rule-based systems, Bayesian models (e.g., Bayesian networks), neural networks, and/or other non-linear training techniques, data fusion, utility-based analytical systems, systems employing Bayesian models, etc. In some embodiments of the invention, machine learning component 410 performs a set of machine learning computations associated with analysis of the generated feature matrix. For example, in some embodiments of the invention, machine learning component 410 performs a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, Gaussian mixture model machine learning computations, a set of regularization machine learning computations, a set of rule learning machine learning computations, a set of Bayesian machine learning computations, a set of deep Boltzmann machine computations, a set of deep belief network computations, a set of convolution neural network computations, a set of stacked auto-encoder computations, and/or a set of different machine learning computations.

Figure 5:
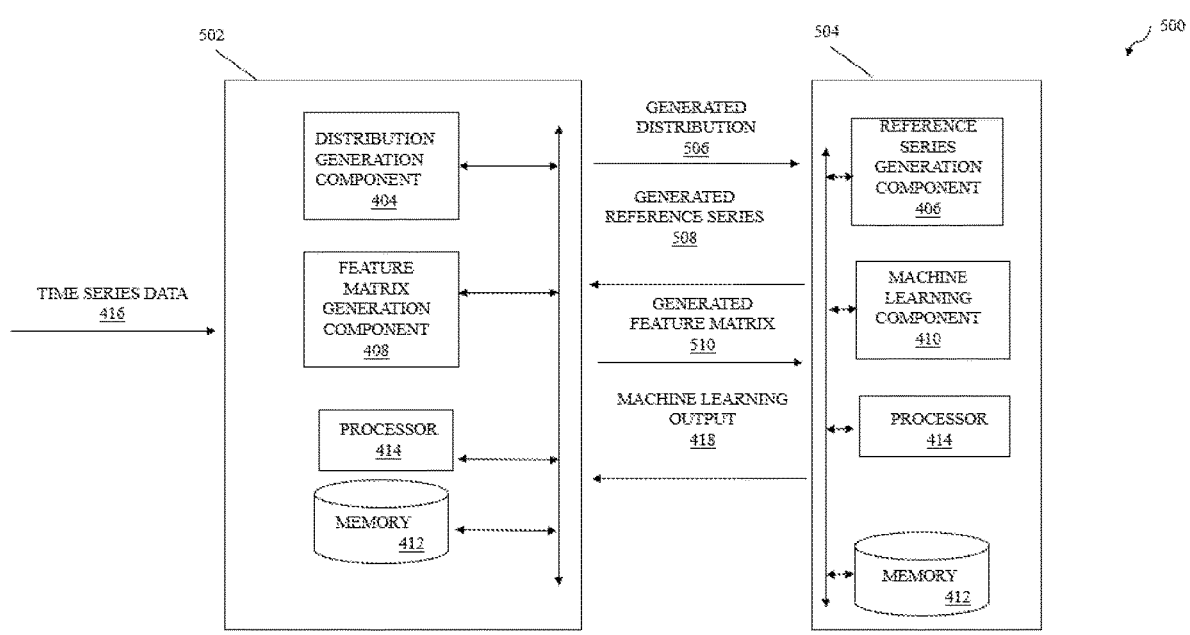
FIG. 5 depicts another exemplary system that facilitates machine learning using time-series data in accordance with one or more embodiments of the present invention.

In the embodiment shown in FIG. 5, system 500 is a two-party protocol system that includes first-party component 502 and second-party component 504. This environment is particularly useful for situations where privacy of time-series data 416 is a concern. For example, if a customer wishes to have machine learning performed by an analytics provider on time-series data but does not wish, or is unable to transfer the time-series data to the analytics provider, in some embodiments of the invention first-party component 502 is employed by the customer and second-party component 504 is employed by the analytics provider in the manner identified below.

As shown in FIG. 5, first-party component 502 includes the distribution component 404 and the feature matrix generation component 408. Second-party component 504 includes the reference series generation component 406 and the machine learning component 410. In some embodiments of the invention, the first-party component 502 and the second-party component 504 include a processor 410 and memory 412.

In some embodiments of the invention, distribution generation component 404 of the first-party component is configured to generate metadata information pertaining to the time-series data 416 by, for example, generating a probability disruption 506 from the time-series data 416. In some embodiments of the invention, distribution generation component 404 transmits the generated probability distribution 506 of the time-series data 416 to the second-party component 504. In some embodiments of the invention, the first-party component 502 does not generate or provide metadata information pertaining to the time-series data 416 to the second-party component 504.

Feature matrix generation component 408 of first-party component 502 is configured to receive the generated set of reference time-series 508 from second-party component 504 and to generate feature matrix 510 based on the set of generated set of reference time-series 508. Feature matrix generation component 408 is further configured to transmit the generated feature matrix 510 to the second-party component 504.

In some embodiments of the invention, reference series generation component 406 of second-party component 504 is configured to receive the generated metadata information (e.g., the probability distribution 506) from first-party component 502 and to generate the set of reference time-series 508. In some embodiments of the invention, the second-party component 504 does not receive metadata information pertaining to the time-series data 416. In some of those instances, second-party component 504 will select or generate a random distribution such as Gaussian distribution. Moreover, in some embodiments of the invention, reference series generation component 406 is configured to transmit the set of reference time-series 508 to the first-party component 502.

Machine learning component 410 of the second-party component 504 is configured to receive the generated feature matrix 510 from first-party component 502 and to provide the generated feature matrix 510 as the input to the one or more machine learning models. Machine learning component 410 of second-party component 504 is further configured to transmit machine learning output 418 from the machine learning models to first-party component 502.

Figure 6:
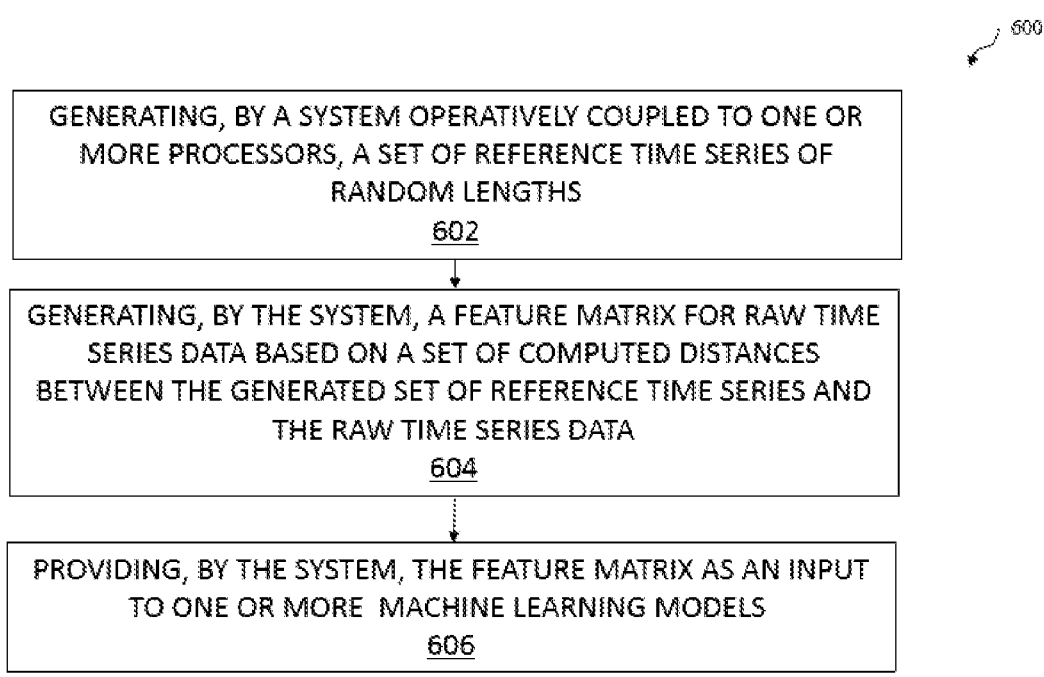
FIG. 6 depicts a flow diagram illustrating a methodology in accordance with one or more embodiments of the present invention.

Additional details of the operation of system 400 and system 500 will now be described with reference to FIG. 6, wherein FIG. 6 depicts a flow diagram illustrating a methodology 600 according to one or more embodiments of the present invention. At 602, a set of reference time-series of random lengths are generated, by a system operatively coupled to a processor (e.g., by reference series generation component 406). At 604, a feature matrix for raw time-series data is generated, by the system (e.g., by feature matrix generation component 408), in which the feature matrix is generated based on a set of computed distances between the generated set of reference time-series and the raw time-series data. At 608, one or more machine learning models are executed by the system (e.g., by machine learning component 410) based on the generated feature matrix.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide, or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments of the invention, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for performing unsupervised time-series feature learning comprising:
generating, by a processor system, a set of reference time-series data of random lengths, wherein each random length is uniformly sampled from a predetermined minimum length to a predetermined maximum length, and wherein values of each reference time-series in the set are drawn from a distribution;

generating, by the processor system, a feature matrix for raw time-series data based on a set of computed distances between the generated set of reference time-series and the raw time-series data, wherein generating the feature matrix comprises approximating a positive definite kernel by transforming the raw time-series data into a low-dimensional Euclidean inner product space using a number R of random series of length D on a randomized feature map to reduce computational complexity;

consuming a portion of memory storage, where a size of the portion is based on a product of a number of time series in the set and a number of random series; and training, by the processor system, one or more machine learning models using the feature matrix as an input for predicting a relationship between reference time-series data and the raw time series data, wherein the training includes performing, by the processor system, a parallel computing process that processes a portion of the feature matrix in parallel with a portion of the time-series data.

2. The computer-implemented method of claim 1, wherein the distribution is a predetermined random distribution.

3. The computer-implemented method of claim 1, wherein the distribution is a probability distribution of the raw time-series data.

4. The computer-implemented method of claim 3, wherein the processor system is a two-party protocol system comprising a first-party component and a second-party component, wherein the first-party component is configured to generate the probability distribution from the raw time-series data, transmit the probability distribution of the raw time-series data to the second-party component, receive the generated set of reference time-series from the second-party component, generate the feature matrix based on the set of generated set of reference time-series, and transmit the generated feature matrix to the second-party component.

5. The computer-implemented method of claim 4, wherein the second-party component is configured to receive the probability distribution from the first-party component, generate the set of reference time-series, transmit the set of reference time-series to the first-party component, receive the generated feature matrix from the first party-component, provide the feature matrix as the input to the one or more machine learning models, and transmit results from the machine learning models to the first-party component.

6. The computer-implemented method of claim 1, wherein generating the feature matrix includes:
computing, by the processor system, a set of distance vectors between the raw time-series data and the set of generated reference time-series;
translating, by the processor system, the distance vectors into similarity vectors; and
concatenating, by the processor system, the similarity vectors to generate the feature matrix.

7. The computer-implemented method of claim 1, wherein generating the feature matrix includes:
computing, by the processor system, a set of feature vectors between the raw time-series data and the set of generated reference time-series using dynamic time warping; and
concatenating, by the system, the feature vectors to generate the feature matrix.

8. A computer program product for performing unsupervised time-series feature learning, the computer program product comprising a computer readable storage medium having program instructions embodied therewith, wherein the computer readable storage medium is not a transitory signal per se, the program instructions executable by a processor system to cause the processor system to perform a method comprising:

generating, by the processor system, a set of reference time-series of random lengths, wherein each length is uniformly sampled from a predetermined minimum length to a predetermined maximum length, and wherein values of each reference time-series in the set are drawn from a distribution;

generating, by the processor system, a feature matrix for raw time-series data based on a set of computed distances between the generated set of reference time-series and the raw time-series data, wherein generating the feature matrix comprises approximating a positive definite kernel by transforming the raw time-series data into a low-dimensional Euclidean inner product space using a number R of random series of length D on a randomized feature map to reduce computational complexity;

consuming a portion of memory storage, where a size of the portion is based on a product of a number of time series in the set and a number of random series; and training, by the processor system, one or more machine learning models using the feature matrix as an input for predicting a relationship between reference time-series data and the raw time series data, wherein the training includes performing, by the processor system, a parallel computing process that processes a portion of the feature matrix in parallel with a portion of the time-series data.

9. The computer program product of claim 8, wherein the distribution is a predetermined random distribution.

10. The computer program product of claim 8, wherein the distribution is a probability distribution of the raw time-series data.

11. The computer program product of claim 8, wherein the processor system is a two-party protocol system comprising a first-party component and a second-party component, wherein the first-party component is configured to generate the probability distribution from the raw time-series data, transmit the probability distribution of the raw time-series data to the second-party component, receive the generated set of reference time-series from the second-party component, generate the feature matrix based on the set of generated set of reference time-series, and transmit the generated feature matrix to the second-party component.

12. The computer program product of claim 11, wherein the second-party component is configured to receive the probability distribution from the first-party component, generate the set of reference time-series, transmit the set of reference time-series to the first-party component, receive the generated feature matrix from the first party-component, provide the feature matrix as the input to the one or more machine learning models, and transmit results from the machine learning models to the first-party component.

13. The computer program product of claim 8, wherein generating the feature matrix includes:
computing, by the processor system, a set of distance vectors between the raw time-series data and the set of generated reference time-series;
translating, by the processor system, the distance vectors into similarity vectors; and concatenating, by the processor system, the similarity vectors to generate the feature matrix.

14. The computer program product of claim 8, wherein generating the feature matrix includes:
computing, by the processor system, a set of feature vectors between the raw time-series data and the set of generated reference time-series using dynamic time warping; and concatenating, by the processor system, the feature vectors to generate the feature matrix.

15. A system for performing unsupervised time-series feature learning, the system comprising one or more processors configured to perform a method comprising:
generating, by the system, a set of reference time-series of random lengths, wherein each length is uniformly sampled from a predetermined minimum length to a predetermined maximum length, and wherein values of each reference time-series in the set are drawn from a distribution;
generating, by the system, a feature matrix for raw time-series data based on a set of computed distances between the generated set of reference time-series and the raw time-series data, wherein generating the feature matrix comprises approximating a positive definite kernel by transforming the raw time-series data into a low-dimensional Euclidean inner product space using a number R of random series of length D on a randomized feature map to reduce computational complexity;
consuming, by the system, a portion of memory storage, where a size of the portion is based on a product of a number of time series in the set and a number of random series; and
training, by the system, one or more machine learning models using the feature matrix as an input for predicting a relationship between reference time-series data and the raw time series data,
wherein the training includes performing, by the processor system, a parallel computing process that processes a portion of the feature matrix in parallel with a portion of the time-series data.

16. The system of claim 15, wherein the distribution is a predetermined random distribution.

17. The system of claim 15, wherein the distribution is a probability distribution of the raw time-series data.

18. The system of claim 17, wherein the system is a two-party protocol system comprising a first-party component and a second-party component, wherein the first-party component is configured to generate the probability distribution from the raw time-series data, transmit the probability distribution of the raw time-series data to the second-party component, receive the generated set of reference time-series from the second-party component, generate the feature matrix based on the set of generated set of reference time-series, and transmit the generated feature matrix to the second-party component.

19. The system of claim 18, wherein the second-party component is configured to receive the probability distribution from the first-party component, generate the set of reference time-series, transmit the set of reference time-series to the first-party component, receive the generated feature matrix from the first party-component, provide the feature matrix as the input to the one or more machine learning models, and transmit results from the machine learning models to the first-party component.

20. The system of claim 15, wherein generating the feature matrix includes:
computing, by the system, a set of feature vectors between the raw time-series data and the set of generated reference time-series using dynamic time warping; and
concatenating, by the system, the feature vectors to generate the feature matrix.

* * * * *